United States Patent
Orus Lacort et al.

(10) Patent No.: US 12,518,190 B2
(45) Date of Patent: Jan. 6, 2026

(54) VARIATIONAL QUANTUM OPTIMIZATION

(71) Applicant: MULTIVERSE COMPUTING S.L., Donostia (ES)

(72) Inventors: Roman Oscar Orus Lacort, Donostia (ES); Pablo Bermejo Navas, Donostia (ES)

(73) Assignee: MULTIVERSE COMPUTING S.L., Donostia (ES)

( * ) Notice: Subject to any disclaimer, the term of this patent is extended or adjusted under 35 U.S.C. 154(b) by 800 days.

(21) Appl. No.: 17/873,667

(22) Filed: Jul. 26, 2022

(65) Prior Publication Data
US 2024/0020568 A1    Jan. 18, 2024

(30) Foreign Application Priority Data
Jul. 12, 2022    (EP) .................................... 22382661

(51) Int. Cl.
*G06N 10/20*    (2022.01)
*G06N 10/60*    (2022.01)
*G06N 10/80*    (2022.01)

(52) U.S. Cl.
CPC ............. *G06N 10/60* (2022.01); *G06N 10/20* (2022.01); *G06N 10/80* (2022.01)

(58) Field of Classification Search
None
See application file for complete search history.

(56) References Cited

U.S. PATENT DOCUMENTS

| | | | |
|---|---|---|---|
| 11,119,773 B1* | 9/2021 | Soeken | G06N 10/40 |
| 2020/0320240 A1* | 10/2020 | Parrish | G06F 30/337 |
| 2021/0216897 A1 | 7/2021 | Woerner et al. | |
| 2022/0284337 A1* | 9/2022 | Radin | G06N 10/60 |
| 2022/0398483 A1* | 12/2022 | Chernoguzov | G06N 10/40 |

OTHER PUBLICATIONS

R. S. Amal et al. "A quantum genetic algorithm for optimization problems on the Bloch sphere" Published online: Jan. 19, 2022—vol. 21, article No. 43, (2022)—Springer, Quantum Information Processing (2022) 21:43 https://doi.org/10.1007/s11128-021-03368-7 (Year: 2022).*

Bermejo et al., "Variational Quantum and Quantum-Inspired Clustering" arxiv. org, Cornell University Library, Jun. 20, 2022, 4 pages.

(Continued)

*Primary Examiner* — Xuyang Xia
(74) *Attorney, Agent, or Firm* — Edell, Shapiro & Finnan, LLC

(57) ABSTRACT

Method for solving a variational quantum optimization problem in a hybrid quantum-classical computing system that includes a classical digital computer and a quantum computer by minimizing a cost function. The cost function comprises N variables, and each of the variables can take up to p different values. The quantum computer includes as many qubits as variables in the cost function, each qubit having p maximally orthogonal states, and a quantum circuit configured for performing a plurality of operations on said qubits. Each qubit represents each of the variables of the cost function, and each maximally orthogonal state of a qubit represents each of the values that the corresponding variable can have.

20 Claims, 3 Drawing Sheets

(56) References Cited

OTHER PUBLICATIONS

European Search Report, EP22382852, May 26, 2023, 11 pages.
Perez-Salinas et al., "Data-re-uploading for a universal quantum classifier", Jan. 30, 2020, https://quantum-journal.org/papers/q-2020-02-06-226 19 pages.
Wikipedia, "Quantum tomography", https://en.wikipedia.org/w/index/php?title=Quantum_tomography&oldid=1084133159, Apr. 22, 2022, 13 pages.
Huggins et al, "A non-orthogonal variational quantum eigensolver", vol. 22, Jul. 10, 2020, https://iopscience.iop.org/article/10.1088/1367-2630/ab867b, 16 pages.

* cited by examiner

VARIATIONAL QUANTUM OPTIMIZATION

CROSS-REFERENCE TO RELATED APPLICATIONS

This application is related to and claims the benefit and priority to European Application No. EP22382661.1, filed Jul. 12, 2022, which is incorporated herein by reference in its entirety.

TECHNICAL FIELD

The present invention relates to variational quantum optimization on gate-based universal quantum computers using non-orthogonal qubit states.

BACKGROUND

Methods for solving a variational quantum optimization problem in a hybrid quantum-classical computing system comprising a classical digital computer and a quantum computer by minimizing a cost function are known. The cost function to be minimized has N variables, N being an integer bigger that 0, and each variable is a discrete variable which can take up to p different values. The solution to the variational quantum optimization problem implies identifying the value of each variable for which the cost function is minimized. Current Noisy-Intermediate Scale devices or NISQ devices are able to optimize such cost functions by reducing its discrete variables to bit variables. This implies that the discrete variables can be expressed in terms of m bit variables each, for instance, if p=4, then m=2, such that the four values obtainable by these two bits represent the four discrete values that each discrete variable can have. Thus, reducing the discrete variables to bit variables implies transforming the original cost function into an equivalent cost function with m×N bit variables.

For minimizing such cost function, current NISQ devices use to assign a qubit to each bit variable of the cost function. However, current NISQ devices have a limited number of qubits, and are therefore only able to minimize cost functions with a small number of discrete variables.

SUMMARY

The object of the invention is to provide a method for solving a variational quantum optimization problem in a hybrid quantum-classical computing system comprising a classical digital computer and a quantum computer by minimizing a cost function, to provide the hybrid quantum-classical computing system for solving such variational quantum optimization problem, and to provide a computer readable storage medium comprising computer-executable instructions for solving the variational quantum optimization problem.

The method of the invention is a method for solving a variational quantum optimization problem in a hybrid quantum-classical computing system comprising a classical digital computer and a quantum computer by means of minimization of a cost function. The cost function comprises N variables, and each of said variables can take up to p different values. The quantum computer comprises as many qubits as variables in the cost function, each qubit having p maximally orthogonal states, and a quantum circuit configured for performing a plurality of operations on said qubits.

The method of the invention comprises the following steps, which are iteratively repeated until the cost of the cost function is minimized:
- a classical optimizer execution step wherein the classical digital computer executes a classical optimizer for the cost function, obtaining a plurality of optimized variational parameters,
- an optimized variational parameter sending step wherein the classical digital computer sends the plurality of optimized variational parameters to the quantum computer,
- a quantum circuit initialization step, wherein the quantum computer initializes the plurality of qubits in an initial quantum state, the initial quantum state being the same for each qubit in all iterations,
- a quantum circuit execution step wherein the quantum circuit modifies the initial quantum state of the qubits based on the values of the optimized variational parameters to a final quantum state,
- a quantum state measuring step wherein the quantum computer measures individually the final quantum state of each of the qubits in the quantum circuit by means of quantum state tomography,
- a quantum state sending step wherein the quantum computer sends the final quantum state of the qubits to the classical digital computer, and
- a cost function calculation step wherein the classical digital computer calculates the cost of the cost function based on the final quantum state of the qubits in the quantum circuit, each qubit representing each of the variables of the cost function, each maximally orthogonal state of a qubit representing each of the values that the corresponding variable can have, and the final quantum state of each qubit corresponding to one of the p maximally orthogonal states of said qubit.

By means of the method of the invention, instead of using a qubit for each bit variable of the cost function as in the methods known in the state of the art, the maximally orthogonal states of a qubit are used for representing the values of a variable of the cost function. In this way, the number of qubits necessary for solving the variational quantum optimization problem is reduced to the number of variables that the cost function that has to be minimized has. Thus, by means of the method of the invention, much larger optimization problems can be solved even if current quantum devices are limited in the number of qubits they can have.

DETAILED DESCRIPTION

Figure 1:
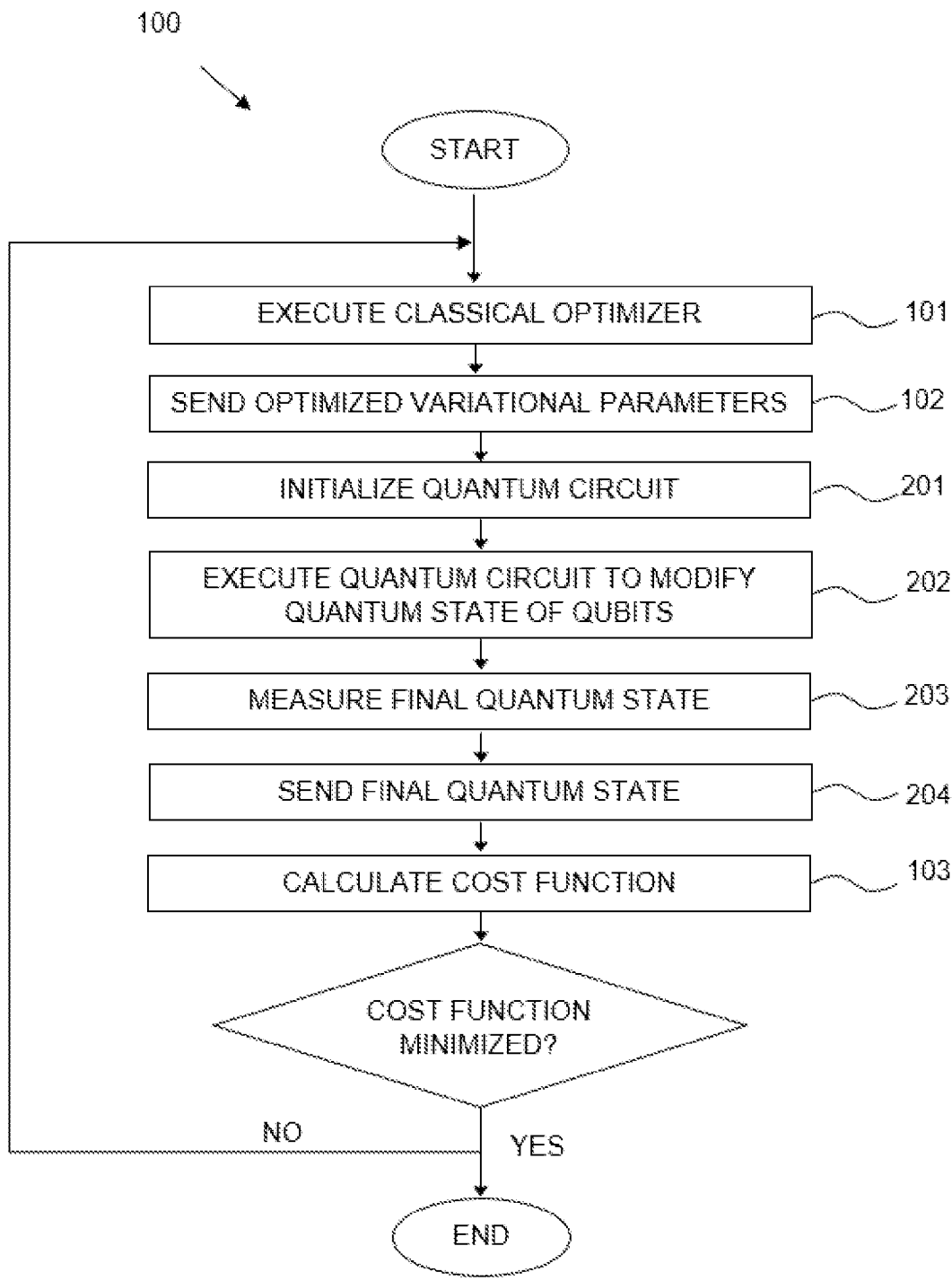
FIG. 1 is a flowchart that illustrates an embodiment of a method for solving a variational quantum optimization problem in a hybrid quantum-classical computing system by minimizing a cost function, according to the present invention.

FIG. 1 illustrates an embodiment of a method 100 for solving a variational quantum optimization problem in a hybrid-quantum-classical computing system 300 according to the present invention.

The method 100 of the invention is configured for solving a variational quantum optimization problem by minimizing a cost function. The cost function comprises N variables, such that each of said variables can take up to p different values.

The hybrid quantum-classical computing system 300 comprises a classical digital computer 500 and a quantum computer 400. The quantum computer 400 comprises as many qubits as variables in the cost function, thus, comprises N qubits, and a quantum circuit configured for performing a plurality of operations on said qubits. Each qubit has p maximally orthogonal states.

The method 100 of the invention comprises the following steps, which are iteratively repeated until the cost of the cost function is minimized:

- a classical optimizer execution step 101 wherein the classical digital computer 500 executes a classical optimizer for the cost function, obtaining a plurality of optimized variational parameters,
- an optimized variational parameter sending step 102 wherein the classical digital computer 500 sends the plurality of optimized variational parameters to the quantum computer 400, a quantum circuit initialization step 201, wherein the quantum computer 400 initializes the plurality of qubits in an initial quantum state, the initial quantum state being the same for each qubit in all iterations,
- a quantum circuit execution step 202 wherein the quantum circuit modifies the initial quantum state of the qubits based on the values of the optimized variational parameters to a final quantum state,
- a quantum state measuring step 203 wherein the quantum computer 400 measures individually the final quantum state of each of the qubits in the quantum circuit by means of quantum state tomography,
- a quantum state sending step 204 wherein the quantum computer 400 sends the final quantum state of the qubits, to the classical digital computer 500, and
- a cost function calculation step 103 wherein the classical digital computer 500 calculates the cost of the cost function based on the final quantum state of the qubits in the quantum circuit, each qubit representing each of the variables of the cost function, each maximally orthogonal state of a qubit representing each of the values that the corresponding variable can have, and the final quantum state of each qubit corresponding to one of the p maximally orthogonal states of said.

The goal of the method 100 of the invention is solving a variational quantum optimization problem by minimizing a cost function. The cost function comprises N variables, N being an integer number bigger that 0, and each of said variables can take up to p different values, p being an integer number bigger than 2. The solution to the variational quantum optimization problem implies identifying the value of each variable for which the cost function is minimized.

The classical digital computer 500 comprises a memory element 504 comprising a computing program, the computing program defining a plurality of computer-executable instructions in a source language, and a processor 502 communicatively coupled to the memory element 504, the memory element 504 comprising the computer-executable instructions that, when executed by the processor 502 cause the processor 502 to perform the steps 101 to 103 of the method 100. In at least one embodiment, the classical digital computer 500 may include one or more I/O interface(s). I/O interface(s) allow for input and output of data and/or information with other entities that may be connected to the classical digital computer 500. For example, I/O interface(s) may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In an embodiment of the method 100 of the invention, the cost function is stored in the memory element 504 of the classical digital computer 500. However, in another embodiment, the cost function can be provided to the classical digital computer 500 from an entity connected to the classical digital computer 500 by means of an I/O interface, such as a keyboard, keypad, a touch screen, portable computer readable (non-transitory) storage media, thumb drives, portable optical or magnetic disks, memory cards, and/or any other suitable input and/or output device now known or hereafter developed.

Figure 4:
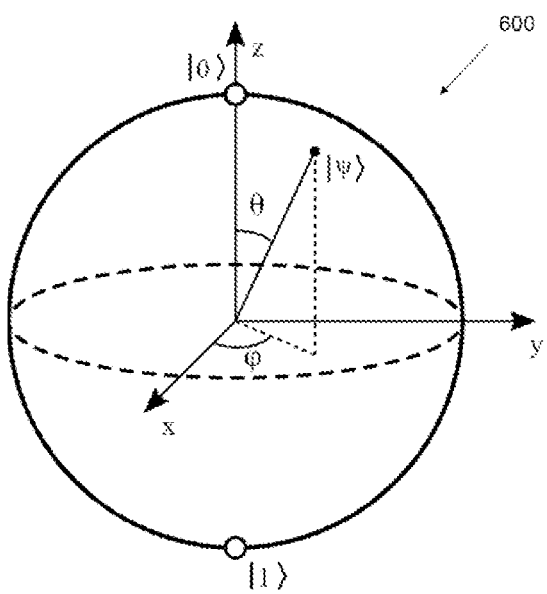
FIG. 4 depicts the quantum state of a qubit, represented as a point on the surface of a Bloch sphere.

In the quantum circuit initialization step 201, the quantum computer 400 initializes the plurality of qubits, this is, the N qubits, in an initial quantum state. Each qubit can be initialized in any quantum state, which can be different among different qubits. The initialization of the qubits takes place each time the quantum circuit is to be executed, just before its execution. In said initialization, each qubit is always initialized in the same initial quantum state. The quantum state of a qubit can be represented as a quantum state vector in a Bloch sphere 600, the Bloch sphere 600 representing a qubit, and the quantum state vector pointing to a point on the surface of the Bloch sphere 600. FIG. 4 depicts the quantum state |ψ⟩ of a qubit, represented as a vector pointing to a point on the surface of the Bloch sphere 600, such that any quantum state of the qubit can be represented by means of the two angles, θ and φ.

The quantum computer 400 is a gate based quantum computer in communication with the classical digital computer 500 which comprises a quantum circuit, the quantum circuit comprising a plurality of quantum gates configured for performing operations on the qubits, such that the quantum circuit modifies the initial quantum state of the qubits from their initial quantum state to a final quantum state. Quantum gates are configured for performing an operation on a qubit, or on more than a qubit. The quantum circuit depends on a plurality of parameters, said parameters defining the operations that the quantum gates of the quantum circuit perform. In an embodiment, the quantum gates are configured for performing unitary rotations on the qubits. In other embodiments, other types of quantum gates are used.

The method 100 is configured to iteratively minimize the cost of the cost function by repeating the classical optimizer execution step 101, the optimized variational parameter sending step 102, the quantum circuit initialization step 201, the quantum circuit execution step 202, the quantum state measuring step 203, the quantum state sending step 204, and finally, the cost function calculation step 103, until the cost function reaches its minimum cost. The values of the variables for which the cost function has its minimum cost are the solution to the variational quantum optimization problem.

In the classical optimizer execution step 101, the classical digital computer 500 executes a classical optimizer for the cost function, obtaining a plurality of optimized variational parameters, stores said randomly obtained variational parameters in the memory element 504, and sends them to the quantum computer 400 in the optimized variational parameter sending step 102. Once the quantum computer 400 receives the plurality of optimized variational parameters, the quantum computer 400 modifies the parameters of the quantum circuit with the values of the optimized variational parameters and executes the quantum circuit in the quantum circuit execution step 202. It is in the quantum circuit execution step 202 where the quantum computer 400 executes the quantum circuit.

In the quantum state measuring step 203 the quantum computer 400 measures individually the final quantum state of each of the qubits in the quantum circuit by means of quantum state tomography. Quantum state tomography is a technique to determine, via measurements, the exact individual quantum state of a qubit, represented as a quantum state vector in the Bloch sphere. When quantum state tomography is used to measure the final quantum state of the qubits, the final quantum state is not limited to being 10> or 11>, but rather the quantum state of each qubit in its respective Bloch sphere, which corresponds, for each qubit to a quantum state vector In the Bloch sphere as the one shown in FIG. 4.

In the quantum state sending step 204 the quantum computer 400 sends the final quantum state of the qubits to the classical digital computer 500.

Once the classical digital computer 500 has received the final quantum state of the qubits from the quantum computer 400, in the cost function calculation step 103 the classical digital computer 500 calculates the cost of the cost function based on the final quantum state of the qubits in the quantum circuit, each final quantum state corresponding to one of the p maximally orthogonal states of said qubit and said maximally orthogonal state corresponding to one of the p values that the corresponding variable can have. In case the minimum cost of the cost function has been reached, the values of the variables for which the cost function has its minimum cost are the solution to the variational quantum optimization problem.

The invention uses different non-orthogonal states of one qubit, in particular, p maximally orthogonal states of one qubit to represent the p different values each variable of the cost function can have. In the invention, p maximally orthogonal states of each qubit are considered, this is, as many maximally orthogonal states as the number of different values that the variables in the cost function can have. The maximally orthogonal states of a qubit are those quantum states whose associated quantum state vectors are maximally separated from each other over the Bloch sphere.

In the invention, each qubit in the quantum circuit of the quantum computer 400 is associated to a variable of the cost function, and each maximally orthogonal state of each qubit is associated to one of the values that the corresponding variable can have. Thus, the classical digital computer 500, when receiving the final quantum state of each qubit, associates the corresponding value to the corresponding variable of the cost function, and calculates the cost of the cost function.

By means of the method 100 of the invention, instead of transforming the cost function into a bit variable cost function and using a qubit for each bit variable as in the methods known in the state of the art, the maximally orthogonal states of a qubit are used for representing the values of a variable of the cost function. In this way, the number of qubits necessary for solving the variational quantum optimization problem is reduced to the number of variables that the cost function to be minimized has. Thus, by means of the method 100 of the invention, much larger optimization problems can be solved even if current quantum devices are limited in the number of qubits they can have.

According to an embodiment, in the first iteration of the method 100, instead of the classical digital computer 500 executing the classical optimizer for the cost function so as to obtain the optimized variational parameters, the classical digital computer 500 randomly obtains the plurality of optimized variational parameters in the classical optimizer execution step 101.

At the first iteration of the method 100, in the classical optimizer execution step 101 the classical digital computer 500 does not have all the information necessary so as to execute the classical optimizer yet. For that reason, in said first iteration, the classical digital computer 500, by means of processor 502, generates randomly a plurality of variational parameters, stores said randomly obtained variational parameters in the memory element 504, and sends them to the quantum computer 400 in the optimized variational parameter sending step 102. Once the quantum computer 400 receives the plurality of randomly obtained variational parameters, the quantum computer 400 modifies the parameters of the quantum circuit with the values of the randomly obtained variational parameters and executes the quantum circuit in the quantum circuit execution step 202.

According to an embodiment, the method 100 for solving a variational quantum optimization problem comprises a value identification step 1031 after the quantum state sending step 204 and before the cost function calculation step 103 wherein the classical digital computer 500 identifies the maximally orthogonal state corresponding to each final quantum state by performing the scalar product of the quantum state vector representing the final quantum state of each qubit and the quantum state vector representing each of the p maximally orthogonal states. For each qubit, the classical digital computer 500, after receiving the final quantum state of said qubit, calculates the scalar product of said final quantum state and the quantum state vector representing each of the p maximally orthogonal states of said qubit, such that the highest scalar product identifies the maximally orthogonal state corresponding to the final quantum state of said qubit. Then, the classical digital computer 500 assigns to the variable associated to said qubit, the value of the variable associated to said maximally orthogonal state. This way, the classical digital computer 500 identifies the value associated to each variable of the cost function and uses said values to calculate the cost of the cost function in the corresponding iteration.

According to an embodiment, in the method 100 for solving a variational quantum optimization problem the maximally orthogonal states of one qubit correspond to Platonic solids inside a Bloch sphere 600 representing said qubit. According to said embodiment, the vector pointing to the center of each Platonic solid corresponds to the quantum state vector representing each of the p maximally orthogonal states.

According to an embodiment, the method of the invention can be used to minimize the cost of a cost function having one variable, said variable having an infinite number of possible values. The only requirement for this is that the quantum state tomography used to measure the final quantum state of each qubit is precise enough so as to be able to identify an infinite number of quantum states on each qubit.

According to an embodiment, the quantum circuit in the quantum computer 400 is a variational ansatz configured to minimize the cost of the cost function. Currently, variational quantum optimization algorithms are used in quantum computers to solve variational quantum optimization problems by means of a quantum circuit. The quantum computer 400 implements a variational quantum optimization algorithm which uses a quantum circuit depending on a plurality of parameters as a variational ansatz to minimize the cost function defined in the classical digital computer 500.

According to an embodiment, the quantum circuit is configured to implement a Variational Quantumn Eigensolver (VQE) algorithm.

According to an embodiment, the quantum circuit is configured to implement a Quantum Approximate Optimization Algorithm (QAOA).

According to an embodiment, the method 100 comprises an initialization step 1011 wherein the classical digital computer 500 initializes the classical optimizer before the classical digital computer 500 executes the classical optimizer for the first time. Depending on the classical optimizer used, it is necessary to initialize some parameters related to the optimizer before executing it. Thus, in this step, the values for said parameters of the classical optimizer are selected.

According to an embodiment of the method 100, the classical optimizer is a stochastic gradient descent optimizer.

According to an embodiment of the method 100, the stochastic gradient descent optimizer is an Adam optimizer. In said embodiment, when initializing the classical optimizer, the learning rate, the batch size and the epochs are selected.

According to an embodiment of the method 100, the stochastic gradient descent optimizer is. A Momentum optimizer.

According to an embodiment of the method 100, the quantum computer 400 is a Noisy-Intermediate Scale (NISQ) quantum computer.

According to an embodiment of the method 100, the quantum computer 400 is a classical digital computer 500 adapted to simulate a quantum computer 400. The quantum part of the method 100 for solving a variational quantum optimization problem is not only suitable to be implemented in a quantum computer 400, but it can also be implemented in a classical digital computer 500 adapted to simulate the variational quantum optimization algorithm implemented in the quantum computer 400.

A second aspect of the invention relates to a hybrid quantum-classical computing system 300 for implementing the method 100 of the invention. The hybrid quantum-classical computing system 300 is thus configured for solving a variational quantum optimization problem and comprises a classical digital computer 500 and a quantum computer 400.

The classical digital computer 500 comprises a memory element 504 comprising a computing program, the computing program defining a plurality of computer-executable instructions in a source language for solving the variational quantum optimization problem by minimizing a cost function, the cost function comprising N variables, such that each of said variables can take up to p different values, and a processor 502 communicatively coupled to the memory element 504.

The quantum computer 400 is in communication with the classical digital computer 500 and comprises a quantum processor comprising as many qubits as the number of variables in the cost function, each qubit having p maximally orthogonal states, and a quantum circuit configured for performing a plurality of operations on said qubits.

The computer-executable instructions, when executed by the processor 502, cause the processor 502 to iteratively execute the following steps until the cost of the cost function is minimized:
execute a classical optimizer for the cost function obtaining a plurality of optimized variational parameters,
send the plurality of optimized variational parameters to the quantum computer 400, and
calculate the cost of the cost function.

The quantum computer 400 is configured to, for each iteration executed by the classical digital computer 500:
initialize the plurality of qubits in an initial quantum state, the initial quantum state being the same for each qubit in all iterations,
execute the quantum circuit, the quantum circuit modifying the initial quantum state of the qubits based on the values of the optimized variational parameters to a final quantum state,
measure individually the final quantum state of each of the qubits in the quantum circuit by means of quantum state tomography, and
send the final quantum state of each of the qubits to the classical digital computer 500.

In each iteration, the cost of the cost function is calculated by the processor 502 based on the final quantum sate of the qubits in the quantum circuit after the corresponding execution of the quantum circuit for said iteration, each qubit representing each of the variables of the cost function, each maximally orthogonal state of a qubit representing each of the values that the corresponding variable can have, and the final quantum state of each qubit corresponding to one of the p maximally orthogonal states of said qubit.

Figure 2:
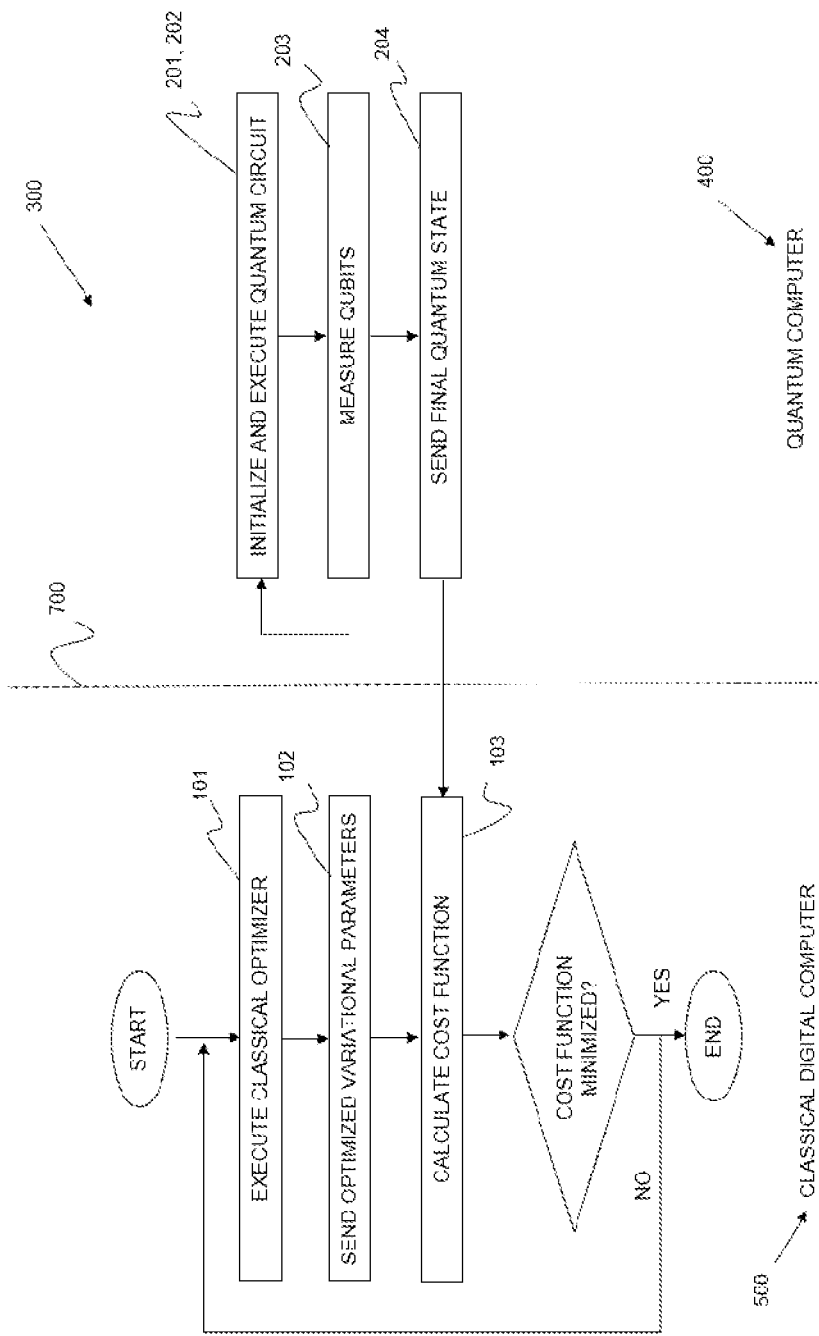
FIG. 2 is a diagram of a hybrid quantum-classical computing system for solving a variational quantum optimization problem according to the embodiment of the method depicted in FIG. 1.

FIG. 2 shows a diagram illustrating the operations performed by the hybrid quantum-classical computing system 300 when implementing the method 100 for solving a variational quantum optimization problem of the invention. The hybrid quantum-classical computing system 300 includes both the classical digital computer 500 and the quantum computer 400. Operations shown on the left of the dashed vertical line 700 typically are performed by the classical digital computer 500, while operations shown on the right of the dashed vertical line 700 typically are performed by the quantum computer 400.

According to an embodiment, in the first iteration of the steps executed by the processor 502 when said processor 502 executes the computer-executable instructions, the processor 502 instead of executing the classical optimizer for the cost function, randomly obtains the plurality of optimized variational parameters. Then, the processor 502 stores said randomly obtained variational parameters in the memory element 504, and sends them to the quantum computer 400.

According to an embodiment, the computer-executable instructions, when executed by the processor 502, cause the processor 502 to identify the maximally orthogonal state corresponding to each final quantum state by performing the scalar product of the quantum state vector representing the final quantum state of each qubit and the quantum state vector representing each of the p maximally orthogonal states, after receiving the final quantum state of each qubit and before calculating the cost of the cost function.

According to an embodiment, the maximally orthogonal states of one qubit correspond to Platonic solids inside a Bloch sphere 600 representing said qubit.

According to an embodiment, the quantum circuit in the quantum computer 400 is a variational ansatz configured to minimize the cost of the cost function.

According to an embodiment, the quantum circuit is configured to implement a Variational Quantum Eigensolver (VQE) algorithm.

According to an embodiment, the quantum circuit is configured to implement a Quantum Approximate Optimization Algorithm (QAOA).

According to an embodiment, the computer-executable instructions, when executed by the processor 502 also cause the processor 502 to initialize the classical optimizer before the classical digital computer 500 executes the classical optimizer for the first time.

According to an embodiment, the classical optimizer is a stochastic gradient descent optimizer, preferably an Adam optimizer or a Momentum optimizer.

According to an embodiment, the quantum computer 400 is a Noisy-Intermediate Scale (NISQ) quantum computer.

According to an embodiment, the quantum computer 400 is a classical digital computer 500 adapted to simulate a quantum computer 400.

Figure 3:
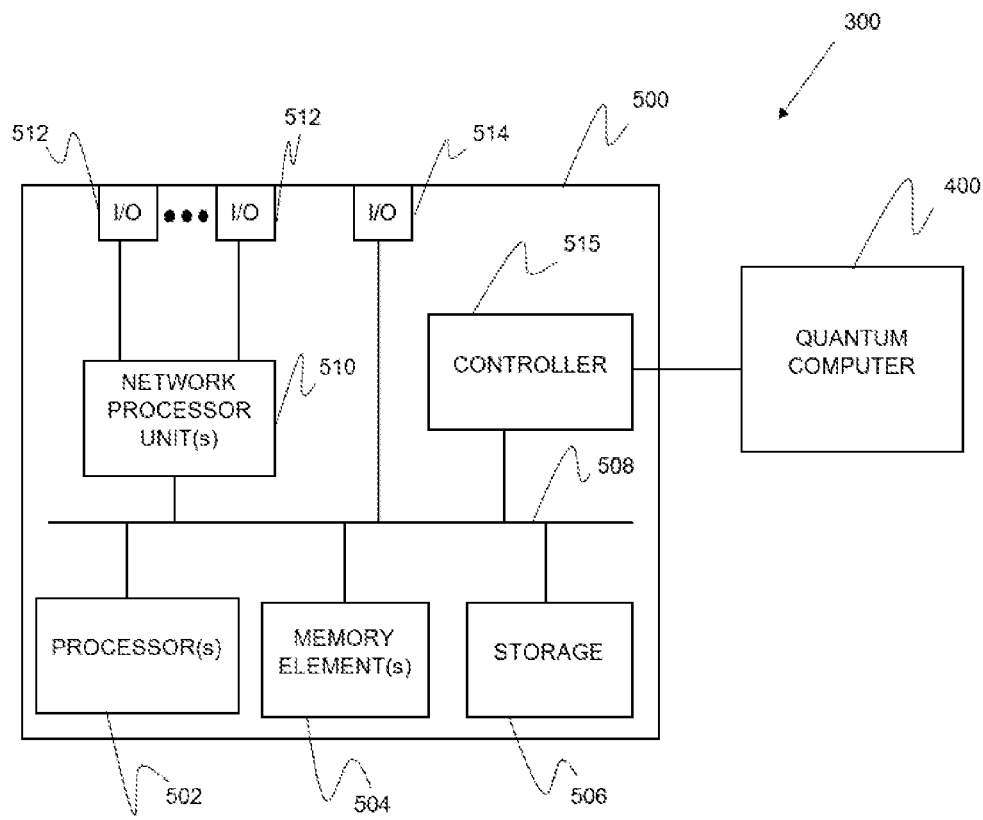
FIG. 3 is a schematic illustration of a hybrid quantum-classical computing system for solving a variational quantum optimization problem according to the embodiment of the method depicted in FIG. 1.

In FIG. 3, a schematic illustration of an embodiment of a hybrid quantum-classical computing system 300 for solving a variational quantum optimization problem according to the invention is shown. In at least one embodiment, the classical digital computer 500 may include in addition to the aforementioned processor 502, and memory element 504, storage 506, a bus 508, one or more network processor unit(s) 510 interconnected with one or more network input/output (I/O) interface(s) 512, one or more I/O interface(s) 514, a controller 515, and control logic 520.

Quantum computer 400 schematically represented in FIG. 3 comprises a quantum processor, the quantum processor being the aforementioned quantum processor in the hybrid quantum-classical computing system 300 according to the invention. The quantum computer 400 is a gate based quantum computer in communication with the classical digital computer 500 which comprises the quantum circuit, the quantum circuit comprising a plurality of quantum gates configured for performing operations on the qubits, such that the quantum circuit modifies the initial quantum state of the qubits from their initial quantum state to a final quantum state. Quantum gates are configured for performing an operation on a qubit, or on more than a qubit. The quantum circuit depends on a plurality of parameters, said parameters defining the operations that the quantum gates of the quantum circuit perform. In an embodiment, the quantum gates are configured for performing unitary rotations on the qubits. In other embodiments, other types of quantum gates are used. The quantum computer 400 further comprises input components, these input components being electric, magnetic or optical components, among others, configured for inputting control signals into the quantum computer 400 for controlling the quantum gates and the qubits, and measurement components configured for reading the state of the qubits in the quantum processor. Nowadays there are different technologies suitable for implementing the quantum computer and the quantum circuit used by the quantum computer. Some but not all of these technologies are based on superconducting platforms, trapped ion platforms, photonic platforms, etc.

In various embodiments, control logic 520 may comprise instructions that, when executed, cause processor(s) 502 to perform operations which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In various embodiments, control logic 520 may comprise instructions that, when executed, cause processor(s) 502 to perform operations, such us simulating a quantum computer.

In at least one embodiment, processor(s) 502 is/are at least one hardware processor configured to execute various tasks, operations and/or functions for classical digital computer 500 according to software and/or instructions configured for classical digital computer 500. Processor(s) 502 (e.g., a hardware processor) can execute any type of instructions associated with data to achieve the operations detailed herein. Any of potential microprocessors, digital signal processor, baseband signal processor, modem, PHY, controllers, systems, managers, logic, and/or machines can be construed as being encompassed within the broad term 'processor'.

In at least one embodiment, memory element(s) 504 and/or storage 506 is/are configured to store data, information, software, and/or instructions associated with the classical digital computer 500. For example, any logic described herein (e.g., control logic 520) can, in various embodiments, be stored for classical digital computer 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of classical digital computer 500 to communicate in order to exchange information and/or data. Bus 508 can be implemented with any architecture designed for passing control, data and/or information between processors, memory elements/storage, peripheral devices, and/or any other hardware and/or software components that may be configured for classical digital computer 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between classical digital computer 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between classical digital computer 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to classical digital computer 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., computing program), logic, parameters, combinations thereof, and/or the like used for operations described herein. This includes memory element(s) 504 and/or storage 506 being able to store data, software, code, instructions (e.g., computing program), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

A third aspect of the invention relates to a computer readable storage medium. The computer readable storage medium of the invention comprises computer-executable instructions for solving a variational quantum optimization problem by minimizing a cost function, the cost function comprising N variables, such that each of said variables can take up to p different values. The computer-executable instructions, when executed by a processor 502 of a classical digital computer 500, are configured to implement the classical part of the method 100 of the invention. The computer-executable instructions, when executed by the processor 502 in the classical digital computer 500 cause the processor 502 to iteratively execute the following steps until the cost of the cost function is minimized:

execute a classical optimizer for the cost function obtaining a plurality of optimized variational parameters, send the plurality of optimized variational parameters to a quantum computer 400, and calculate the cost of the cost function.

The quantum computer 400 is in communication with the classical digital computer 500 and comprises as many qubits as variables in the cost function, and a quantum circuit configured for performing a plurality of operations on said qubits. Each qubit has p maximally orthogonal states.

The quantum computer 400 is configured to, for each iteration executed by the classical digital computer 500:

initialize the plurality of qubits in an initial quantum state, the initial quantum state being the same for each qubit in all iterations, execute the quantum circuit, the quantum circuit modifying the initial quantum state of the qubits based on the values of the optimized variational parameters to a final quantum state, measure individually the final quantum state of each of the qubits in the quantum circuit by means of quantum state tomography, and send the final quantum state of each of the qubits to the classical digital computer 500.

The computer-executable instructions, when executed by the processor 502 in the classical digital computer 500 cause the processor 502 to calculate the cost of the cost function. The cost of the cost function is calculated by the processor 502 based on the final quantum sate of the qubits in the quantum circuit after the corresponding execution of the quantum circuit for said iteration, each qubit representing each of the variables of the cost function, each maximally orthogonal state of a qubit representing each of the values that the corresponding variable can have, and the final quantum state of each qubit corresponding to one of the p maximally orthogonal states of said qubit.

According to an embodiment, in the first iteration of the steps executed by the processor 502 when said processor 502 executes the computer-executable instructions, the processor 502 instead of executing the classical optimizer for the cost function, randomly obtains the plurality of optimized variational parameters.

According to an embodiment, the computer-executable instructions, when executed by the processor 502, cause the processor 502 to identify the maximally orthogonal state corresponding to each final quantum state by performing the scalar product of the quantum state vector representing the final quantum state of each qubit and the quantum state vector representing each of the p maximally orthogonal states, after receiving the final quantum state of each qubit and before calculating the cost of the cost function.

According to an embodiment, the maximally orthogonal states of one qubit correspond to Platonic solids inside a Bloch sphere 600 representing said qubit.

According to an embodiment of the computer readable storage medium, the quantum circuit is a variational ansatz configured to minimize the cost of the cost function.

According to an embodiment of the computer readable storage medium, the quantum circuit is configured to implement a Variational Quantum Eigensolver (VQE) algorithm.

According to an embodiment of the computer readable storage medium, the quantum circuit is configured to implement a Quantum Approximate Optimization Algorithm (QAOA).

According to and embodiment of the computer readable storage medium, the computer-executable instructions, when executed by the processor 502 also cause the processor 502 to initialize the classical optimizer before the classical digital computer 500 executes the classical optimizer for the first time.

According to an embodiment of the computer readable storage medium, the classical optimizer is a stochastic gradient descent optimizer, preferably an Adam optimizer or a Momentum optimizer.

According to an embodiment of the computer readable storage medium, the quantum computer 400 is a Noisy-Intermediate Scale (NISQ) quantum computer.

According to an embodiment of the computer readable storage medium, the quantum computer 400 is a classical digital computer 500 adapted to simulate a quantum computer 400.

Additional embodiments are disclosed in the following clauses.

Clause 1. Method for solving a variational quantum optimization problem in a hybrid quantum-classical computing system (300) comprising a classical digital computer (500) and a quantum computer (400) by minimizing a cost function, the cost function comprising N variables, such that each of said variables can take up to p different values, the quantum computer (400) comprising as many qubits as variables in the cost function, each qubit having p maximally orthogonal states, and a quantum circuit configured for performing a plurality of operations on said qubits, the method (100) comprising the following steps, which are iteratively repeated until the cost of the cost function is minimized:
- a classical optimizer execution step (101) wherein the classical digital computer (500) executes a classical optimizer for the cost function, obtaining a plurality of optimized variational parameters,
- an optimized variational parameter sending step (102) wherein the classical digital computer (500) sends the plurality of optimized variational parameters to the quantum computer (400),
- a quantum circuit initialization step (201), wherein the quantum computer (400) initializes the plurality of qubits in an initial quantum state, the initial quantum state being the same for each qubit in all iterations,
- a quantum circuit execution step (202) wherein the quantum circuit modifies the initial quantum state of the qubits based on the values of the optimized variational parameters to a final quantum state,
- a quantum state measuring step (203) wherein the quantum computer (400) measures individually the final quantum state of each of the qubits in the quantum circuit by means of quantum state tomography,
- a quantum state sending step (204) wherein the quantum computer (400) sends the final quantum state of the qubits to the classical digital computer (500), and
- a cost function calculation step (103) wherein the classical digital computer (500) calculates the cost of the cost function based on the final quantum state of the qubits in the quantum circuit, each qubit representing each of the variables of the cost function, each maximally orthogonal state of a qubit representing each of the values that the corresponding variable can have, and the final quantum state of each qubit corresponding to one of the p maximally orthogonal states of said qubit.

Clause 2. Method for solving a variational quantum optimization problem according to clause 1, wherein in the first iteration of the method (100), instead of the classical digital computer (500) executing the classical optimizer for the cost function, the classical digital computer (500) randomly obtains the plurality of optimized variational parameters in the classical optimizer execution step (101).

Clause 3. Method for solving a variational quantum optimization problem according to clause 1 or 2, wherein the method (100) comprises a value identification step (1031) after the quantum state sending step (204) and before the cost function calculation step (103) wherein the classical digital computer (500) identifies the maximally orthogonal state corresponding to each final quantum state by performing the scalar product of the quantum state vector representing the final quantum state of each qubit and the quantum state vector representing each of the p maximally orthogonal states.

Clause 4. Method for solving a variational quantum optimization problem according to any of the preceding clauses, wherein the maximally orthogonal states of one qubit correspond to Platonic solids inside a Bloch sphere (600) representing said qubit.

Clause 5. Method for solving a variational quantum optimization problem according to any of the preceding clauses, wherein the quantum circuit is a variational ansatz configured to minimize the cost of the cost function.

Clause 6. Method for solving a variational quantum optimization problem according to clause 5, wherein the quantum circuit is configured to implement a Variational Quantum Eigensolver (VQE) algorithm.

Clause 7. Method for solving a variational quantum optimization problem according to clause 5, wherein the quantum circuit is configured to implement a Quantum Approximate Optimization Algorithm (QAOA).

Clause 8. Method for solving a variational quantum optimization problem according to any of the preceding clauses, comprising an initialization step (1011) wherein the classical digital computer (500) initializes the classical optimizer before the classical digital computer (500) executes the classical optimizer for the first time.

Clause 9. Method for solving a variational quantum optimization problem according to any of the preceding clauses, wherein the classical optimizer is a stochastic gradient descent optimizer, preferably an Adam optimizer or a Momentum optimizer.

Clause 10. Method for solving a variational quantum optimization problem according to any of the preceding clauses, wherein the quantum computer (400) is a Noisy-Intermediate Scale (NISQ) quantum computer.

Clause 11. Method for solving a variational quantum optimization problem according to any of clauses 1 to 9, wherein the quantum computer (400) is a classical digital computer (500) adapted to simulate a quantum computer (400).

Clause 12. Hybrid quantum-classical computing system comprising:
- a classical digital computer (500) comprising:
  - a memory element (504) comprising a computing program, the computing program defining a plurality of computer-executable instructions in a source language for solving a variational quantum optimization problem by minimizing a cost function, the cost function comprising N variables, such that each of said variables can take up to p different values, and a processor (502) communicatively coupled to the memory element (504), and a quantum computer (400) in communication with the classical digital computer (500), the quantum computer (400) comprising a quantum processor comprising as many qubits as the number of variables in the cost function, each qubit having p maximally orthogonal states, and a quantum circuit configured for performing a plurality of operations on said qubits, wherein the computer-executable instructions, when executed by the processor (502), cause the processor (502) to iteratively execute the following steps until the cost of the cost function is minimized:

execute a classical optimizer for the cost function obtaining a plurality of optimized variational parameters, send the plurality of optimized variational parameters to the quantum computer (400), and calculate the cost of the cost function, the quantum computer (400) being configured to, for each iteration executed by the classical digital computer (500):

initialize the plurality of qubits in an initial quantum state, the initial quantum state being the same for each qubit in all iterations, execute the quantum circuit, the quantum circuit modifying the initial quantum state of the qubits based on the values of the optimized variational parameters to a final quantum state, measure individually the final quantum state of each of the qubits in the quantum circuit by means of quantum state tomography, and send the final quantum state of each of the qubits to the classical digital computer (500), wherein in each iteration the cost of the cost function is calculated by the processor (502) based on the final quantum sate of the qubits in the quantum circuit after the corresponding execution of the quantum circuit for said iteration, each qubit representing each of the variables of the cost function, each maximally orthogonal state of a qubit representing each of the values that the corresponding variable can have, and the final quantum state of each qubit corresponding to one of the p maximally orthogonal states of said qubit.

Clause 13. Hybrid quantum-classical computing system according to clause 12, wherein in the first iteration, instead of executing the classical optimizer for the cost function, the computer-executable instructions cause the processor (502) to randomly obtain the plurality of optimized variational parameters.

Clause 14. Hybrid quantum-classical computing system according to clause 12 or 13, wherein the computer-executable instructions, when executed by the processor (502), cause the processor (502) to identify the maximally orthogonal state corresponding to each final quantum state by performing the scalar product of the quantum state vector representing the final quantum state of each qubit and the quantum state vector representing each of the p maximally orthogonal states, after receiving the final quantum state of each qubit and before calculating the cost of the cost function.

Clause 15. Hybrid quantum-classical computing system according to any of clauses 12 or 14, wherein the maximally orthogonal states of one qubit correspond to Platonic solids inside a Bloch sphere (600) representing said qubit.

Clause 16. Hybrid quantum-classical computing system according to any of clauses 12 to 15, wherein the quantum circuit is a variational ansatz configured to minimize the cost of the cost function.

Clause 17. Hybrid quantum-classical computing system according to clause 16, wherein the quantum circuit is configured to implement a Variational Quantum Eigensolver (VQE) algorithm.

Clause 18. Hybrid quantum-classical computing system according to clause 16, wherein the quantum circuit is configured to implement a Quantum Approximate Optimization Algorithm (QAOA).

Clause 19. Hybrid quantum-classical computing system according to any of clauses 10 to 18, wherein the computer-executable instructions, when executed by the processor (502) also cause the processor (502) to initialize the classical optimizer before the classical digital computer (500) executes the classical optimizer for the first time.

Clause 20. Hybrid quantum-classical computing system according to any of clauses 10 to 19, wherein the classical optimizer is a stochastic gradient descent optimizer, preferably an Adam optimizer or a Momentum optimizer.

Clause 21. Hybrid quantum-classical computing system according to any of clauses 10 to 20, wherein the quantum computer (400) is a Noisy-Intermediate Scale (NISQ) quantum computer.

Clause 22. Hybrid quantum-classical computing system according to any of clauses 10 to 20, wherein the quantum computer (400) is a classical digital computer (500) adapted to simulate a quantum computer (400).

Clause 23. Computer readable storage medium comprising computer-executable instructions for a method for solving a variational quantum optimization problem by minimizing a cost function, the cost function comprising N variables, such that each of said variables can take up to p different values, wherein when the computer-executable instructions are executed by a processor (502) in a classical digital computer (500) cause the processor (502) to iteratively execute the following steps until the cost of the cost function is minimized:

execute a classical optimizer for the cost function obtaining a plurality of optimized variational parameters, send the plurality of optimized variational parameters to a quantum computer (400), and calculate the cost of the cost function, the quantum computer (400) being in communication with the classical digital computer (500), the quantum computer (400) comprising as many qubits as variables in the cost function, each qubit having p maximally orthogonal states, and a quantum circuit configured for performing a plurality of operations on said qubits, the quantum computer (400) being configured to, for each iteration executed by the classical digital computer (500):

initialize the plurality of qubits in an initial quantum state, the initial quantum state being the same for each qubit in all iterations, execute the quantum circuit, the quantum circuit modifying the initial quantum state of the qubits based on the values of the optimized variational parameters to a final quantum state, measure individually the final quantum state of each of the qubits in the quantum circuit by means of quantum state tomography, and send the final quantum state of each of the qubits to the classical digital computer (500), wherein in each iteration, the cost of the cost function is calculated by the processor (502) based on the final quantum sate of the qubits in the quantum circuit after the corresponding execution of the quantum circuit for said iteration, each qubit representing each of the variables of the cost function, each maximally orthogonal state of a qubit representing each of the values that the corresponding variable can have, and the final quantum state of each qubit corresponding to one of the p maximally orthogonal states of said qubit.

Clause 24. Computer readable storage medium according to clause 23, wherein in the first iteration, instead of executing the classical optimizer for the cost function, the computer-executable instructions cause the processor (502) to randomly obtain the plurality of optimized variational parameters.

Clause 25. Computer readable storage medium according to clause 23 or 24, wherein the computer-executable instructions, when executed by the processor (502), cause the processor (502) to identify the maximally orthogonal state corresponding to each final quantum state by performing the scalar product of the quantum state vector representing the final quantum state of each qubit and the quantum state vector representing each of the p maximally orthogonal states, after receiving the final quantum state of each qubit and before calculating the cost of the cost function.

Clause 26. Computer readable storage medium according to any of clauses 23 to 25, wherein the maximally orthogonal states of one qubit correspond to Platonic solids inside a Bloch sphere (600) representing said qubit.

Clause 27. Computer readable storage medium according to any of clauses 23 to 26, wherein the quantum circuit is a variational ansatz configured to minimize the cost of the cost function.

Clause 28. Computer readable storage medium according to clause 27, wherein the quantum circuit is configured to implement a Variational Quantum Eigensolver (VQE) algorithm.

Clause 29. Computer readable storage medium according to clause 27, wherein the quantum circuit is configured to implement a Quantum Approximate Optimization Algorithm (QAOA).

Clause 30. Computer readable storage medium according to any of clauses 23 to 29, wherein the computer-executable instructions, when executed by the processor (502) also cause the processor (502) to initialize the classical optimizer before the classical digital computer (500) executes the classical optimizer for the first time.

Clause 31. Computer readable storage medium according to any of clauses 23 to 30, wherein the classical optimizer is a stochastic gradient descent optimizer, preferably an Adam optimizer or a Momentum optimizer.

Clause 32. Computer readable storage medium according to any of clauses 23 to 31, wherein the quantum computer (400) is a Noisy-Intermediate Scale (NISQ) quantum computer.

Clause 33. Computer readable storage medium according to any of clauses 23 to 31, wherein the quantum computer (400) is a classical digital computer (500) adapted to simulate a quantum computer (400).

What is claimed is:

1. A method for solving a variational quantum optimization problem in a hybrid quantum-classical computing system comprising a classical digital computer and a quantum computer by minimizing a cost function, the cost function comprising N variables, such that each of said variables can take up to p different values, the quantum computer comprising as many qubits as variables in the cost function, each qubit having p maximally orthogonal states, and a quantum circuit configured for performing a plurality of operations on said qubits, the method comprising the following steps, which are iteratively repeated until a cost of the cost function is minimized:

a classical optimizer execution step wherein the classical digital computer executes a classical optimizer for the cost function, obtaining a plurality of optimized variational parameters;

an optimized variational parameter sending step wherein the classical digital computer sends the plurality of optimized variational parameters to the quantum computer;

a quantum circuit initialization step wherein the quantum computer initializes the qubits in an initial quantum state, the initial quantum state being the same for each qubit in all iterations;

a quantum circuit execution step wherein the quantum circuit modifies the initial quantum state of the qubits based on values of the plurality of optimized variational parameters to a final quantum state of each of the qubits;

a quantum state measuring step wherein the quantum computer measures individually the final quantum state of each of the qubits in the quantum circuit by means of quantum state tomography;

a quantum state sending step wherein the quantum computer sends the final quantum state of each of the qubits to the classical digital computer;

a value identification step wherein the classical digital computer identifies a maximally orthogonal state corresponding to each final quantum state, the maxim ally orthogonal states of each qubit being maximally separated from each other on a Bloch sphere; and a cost function calculation step wherein the classical digital computer calculates the cost of the cost function based on the final quantum state of each of the qubits in the quantum circuit, each qubit representing each of the variables of the cost function, each maximally orthogonal state of a qubit representing each of the values that the corresponding variable of the cost function can have, and the final quantum state of each qubit corresponding to one of the p maximally orthogonal states of said qubit.

2. The method for solving a variational quantum optimization problem according to claim 1, wherein in a first iteration of the method, instead of the classical digital computer executing the classical optimizer for the cost function, the classical digital computer randomly obtains the plurality of optimized variational parameters in the classical optimizer execution step.

3. The method for solving a variational quantum optimization problem according to claim 1, wherein the classical digital computer identifies the maximally orthogonal state corresponding to each final quantum state by performing a scalar product of a quantum state vector representing the final quantum state of each qubit and the quantum state vector representing each of the p maximally orthogonal states.

4. The method for solving a variational quantum optimization problem according to claim 1, wherein the maximally orthogonal states of one qubit correspond to Platonic solids inside a Bloch sphere representing said qubit.

5. The method for solving a variational quantum optimization problem according to claim 1, wherein the quantum circuit is a variational ansatz configured to minimize the cost of the cost function.

6. The method for solving a variational quantum optimization problem according to claim 5, wherein the quantum circuit is configured to implement a Variational Quantum Eigensolver (VQE) algorithm.

7. The method for solving a variational quantum optimization problem according to claim 5, wherein the quantum circuit is configured to implement a Quantum Approximate Optimization Algorithm (QAOA).

8. The method for solving a variational quantum optimization problem according to claim 1, wherein the quantum computer is a Noisy-Intermediate Scale (NISQ) quantum computer.

9. The method for solving a variational quantum optimization problem according to claim 1, wherein the quantum computer is a classical digital computer adapted to simulate a quantum computer.

10. A hybrid quantum-classical computing system comprising:
   a classical digital computer comprising:
      a memory element comprising a computing program, the computing program defining a plurality of computer-executable instructions in a source language for solving a variational quantum optimization problem by minimizing a cost function, the cost function comprising N variables, such that each of said variables can take up to p different values; and
   a processor communicatively coupled to the memory element; and
   a quantum computer in communication with the classical digital computer, the quantum computer comprising a quantum processor comprising as many qubits as the number of variables in the cost function, each qubit having p maximally orthogonal states, and a quantum circuit configured for performing a plurality of operations on said qubits;
   wherein the computer-executable instructions, when executed by the processor, cause the processor to iteratively execute the following steps until a cost of the cost function is minimized:
   execute a classical optimizer for the cost function obtaining a plurality of optimized variational parameters;
   send the plurality of optimized variational parameters to the quantum computer; and
   calculate the cost of the cost function;
   the quantum computer being configured to, for each iteration executed by the classical digital computer:
   initialize the qubits in an initial quantum state, the initial quantum state being the same for each qubit in all iterations;
   execute the quantum circuit, the quantum circuit modifying the initial quantum state of the qubits based on values of the plurality of optimized variational parameters to a final quantum state of each of the qubits;
   measure individually the final quantum state of each of the qubits in the quantum circuit by means of quantum state tomography; and
   send the final quantum state of each of the qubits to the classical digital computer;
   wherein the computer-executable instructions, when executed by the processor, further cause the processor to identify a maximally orthogonal state corresponding to each final quantum state, the maximally orthogonal states of each qubit being maximally separated from each other on a Bloch sphere;
   wherein, in each iteration, the cost of the cost function is calculated by the processor based on the final quantum state of each of the qubits in the quantum circuit after the corresponding execution of the quantum circuit for said iteration, each qubit representing each of the variables of the cost function, each maximally orthogonal state of a qubit representing each of the values that the corresponding variable of the cost function can have, and the final quantum state of each qubit corresponding to one of the p maximally orthogonal states of said qubit.

11. The hybrid quantum-classical computing system according to claim 10, wherein in the first iteration, instead of executing the classical optimizer for the cost function, the computer-executable instructions cause the processor to randomly obtain the plurality of optimized variational parameters.

12. The hybrid quantum-classical computing system according to claim 10, wherein the computer-executable instructions, when executed by the processor, cause the processor to identify the maximally orthogonal state corresponding to each final quantum state by performing a scalar product of a quantum state vector representing the final quantum state of each qubit and the quantum state vector representing each of the p maximally orthogonal states.

13. The hybrid quantum-classical computing system according to claim 10, wherein the quantum circuit is a variational ansatz configured to minimize the cost of the cost function.

14. The hybrid quantum-classical computing system according to claim 13, wherein the quantum circuit is configured to implement a Variational Quantum Eigensolver (VQE) algorithm.

15. The hybrid quantum-classical computing system according to claim 13, wherein the quantum circuit is configured to implement a Quantum Approximate Optimization Algorithm (QAOA).

16. The hybrid quantum-classical computing system according to claim 10, wherein the quantum computer is a Noisy-Intermediate Scale (NISQ) quantum computer.

17. The hybrid quantum-classical computing system according to claim 10, wherein the quantum computer is a classical digital computer adapted to simulate a quantum computer.

18. A non-transitory computer readable storage medium comprising computer-executable instructions for a method for solving a variational quantum optimization problem by minimizing a cost function, the cost function comprising N variables, such that each of said variables can take up to p different values, wherein when the computer-executable instructions are executed by a processor in a classical digital computer the computer-executable instructions cause the processor to iteratively execute the following steps until a cost of the cost function is minimized:
   execute a classical optimizer for the cost function obtaining a plurality of optimized variational parameters;
   send the plurality of optimized variational parameters to a quantum computer; and
   calculate the cost of the cost function;
   the quantum computer being in communication with the classical digital computer, the quantum computer comprising as many qubits as variables in the cost function, each qubit having p maximally orthogonal states, and a quantum circuit configured for performing a plurality of operations on said qubits, the quantum computer being configured to, for each iteration executed by the classical digital computer:

initialize the qubits in an initial quantum state, the initial quantum state being the same for each qubit in all iterations;

execute the quantum circuit, the quantum circuit modifying the initial quantum state of the qubits based on values of the plurality of optimized variational parameters to a final quantum state of each of the qubits;

measure individually the final quantum state of each of the qubits in the quantum circuit by means of quantum state tomography; and send the final quantum state of each of the qubits to the classical digital computer;

wherein the computer-executable instructions, when executed by the processor, further cause the processor to identify a maximally orthogonal state corresponding to each final quantum state, the maximally orthogonal states of each qubit being maximally separated from each other on a Bloch sphere;

wherein, in each iteration, the cost of the cost function is calculated by the processor based on the final quantum state of each of the qubits in the quantum circuit after the corresponding execution of the quantum circuit for said iteration, each qubit representing each of the variables of the cost function, each maximally orthogonal state of a qubit representing each of the values that the corresponding variable of the cost function can have, and the final quantum state of each qubit corresponding to one of the p maximally orthogonal states of said qubit.

19. The non-transitory computer readable storage medium according to claim 18, wherein in the first iteration, instead of executing the classical optimizer for the cost function, the computer-executable instructions cause the processor to randomly obtain the plurality of optimized variational parameters.

20. The non-transitory computer readable storage medium according to claim 18, wherein the computer-executable instructions, when executed by the processor, cause the processor to identify the maximally orthogonal state corresponding to each final quantum state by performing a scalar product of a quantum state vector representing the final quantum state of each qubit and the quantum state vector representing each of the p maximally orthogonal states.

* * * * *